(12) United States Patent
Olshanetsky et al.

(10) Patent No.: US 7,207,347 B2
(45) Date of Patent: Apr. 24, 2007

(54) DUAL FUNCTION VALVE FOR FUEL TANK

(75) Inventors: Vladimir Olshanetsky, Beer Sheva (IL); Omer Vulkan, Kibbutz Mashbei Sadeh (IL); Yaron Kaspi, Yam Hamelach (IL); Ilan Akian, Halutza (IL)

(73) Assignee: Raval A.S.C. Ltd., Halutza (IL)

( * ) Notice: Subject to any disclaimer, the term of this patent is extended or adjusted under 35 U.S.C. 154(b) by 149 days.

(21) Appl. No.: 10/923,024

(22) Filed: Aug. 23, 2004

(65) Prior Publication Data

US 2006/0037642 A1   Feb. 23, 2006

(51) Int. Cl.
*F16K 24/04* (2006.01)

(52) U.S. Cl. .................... 137/202; 137/43; 137/39

(58) Field of Classification Search ............. 137/202, 137/43, 587
See application file for complete search history.

(56) References Cited

U.S. PATENT DOCUMENTS

| | | | | |
|---|---|---|---|---|
| 5,443,561 A | * | 8/1995 | Sakata et al. ........... 137/202 |
| 5,462,100 A | * | 10/1995 | Covert et al. ........... 137/43 |
| 5,529,086 A | * | 6/1996 | Kasugai et al. ........ 137/202 |
| 5,582,198 A | * | 12/1996 | Nagino et al. .......... 137/43 |
| 5,711,339 A | | 1/1998 | Kurihara |
| 5,738,132 A | | 4/1998 | Zakai et al. |
| 5,762,090 A | | 6/1998 | Halamish et al. |
| 5,797,434 A | | 8/1998 | Benjey et al. |
| 5,931,183 A | * | 8/1999 | Yoshihara .............. 137/202 |
| 5,983,958 A | * | 11/1999 | Bergsma et al. ........ 137/202 |
| 6,003,539 A | * | 12/1999 | Yoshihara .............. 137/202 |
| 6,035,883 A | * | 3/2000 | Benjey .................. 137/202 |
| 6,058,970 A | * | 5/2000 | Osaki et al. ............ 137/202 |
| 6,062,250 A | * | 5/2000 | Takahashi .............. 137/202 |
| 6,240,950 B1 | | 6/2001 | Harris |
| 6,439,206 B1 | * | 8/2002 | Shimamura et al. .... 137/202 |
| 6,513,541 B1 | * | 2/2003 | Herlihy ................. 137/202 |
| 6,675,779 B2 | | 1/2004 | King et al. |
| 6,701,950 B2 | * | 3/2004 | Brock et al. ........... 137/43 |
| 6,701,952 B1 | * | 3/2004 | Ehrman et al. ......... 137/202 |
| 2002/0144730 A1 | | 10/2002 | Brock et al. |
| 2003/0066558 A1 | * | 4/2003 | Muto et al. ............ 137/202 |
| 2003/0189110 A1 | | 10/2003 | Kurihara et al. |
| 2004/0003843 A1 | | 1/2004 | Sugiyama et al. |

FOREIGN PATENT DOCUMENTS

WO   WO-99/16633 A1   4/1999
WO   WO-00/53960 A1   9/2000

* cited by examiner

*Primary Examiner*—Eric Keasel
*Assistant Examiner*—Cloud Lee
(74) *Attorney, Agent, or Firm*—Birch, Stewart, Kolasch & Birch, LLP

(57) ABSTRACT

A valve comprising a housing accommodating a first and a second outlet port, a first stage float member associated with the first outlet port and a second stage float member associated with the second outlet port. The float members are displaceable within the housing about parallel axes, between an open position and a closed position. The first stage float member at least partially overlaps over the second stage float member.

21 Claims, 10 Drawing Sheets

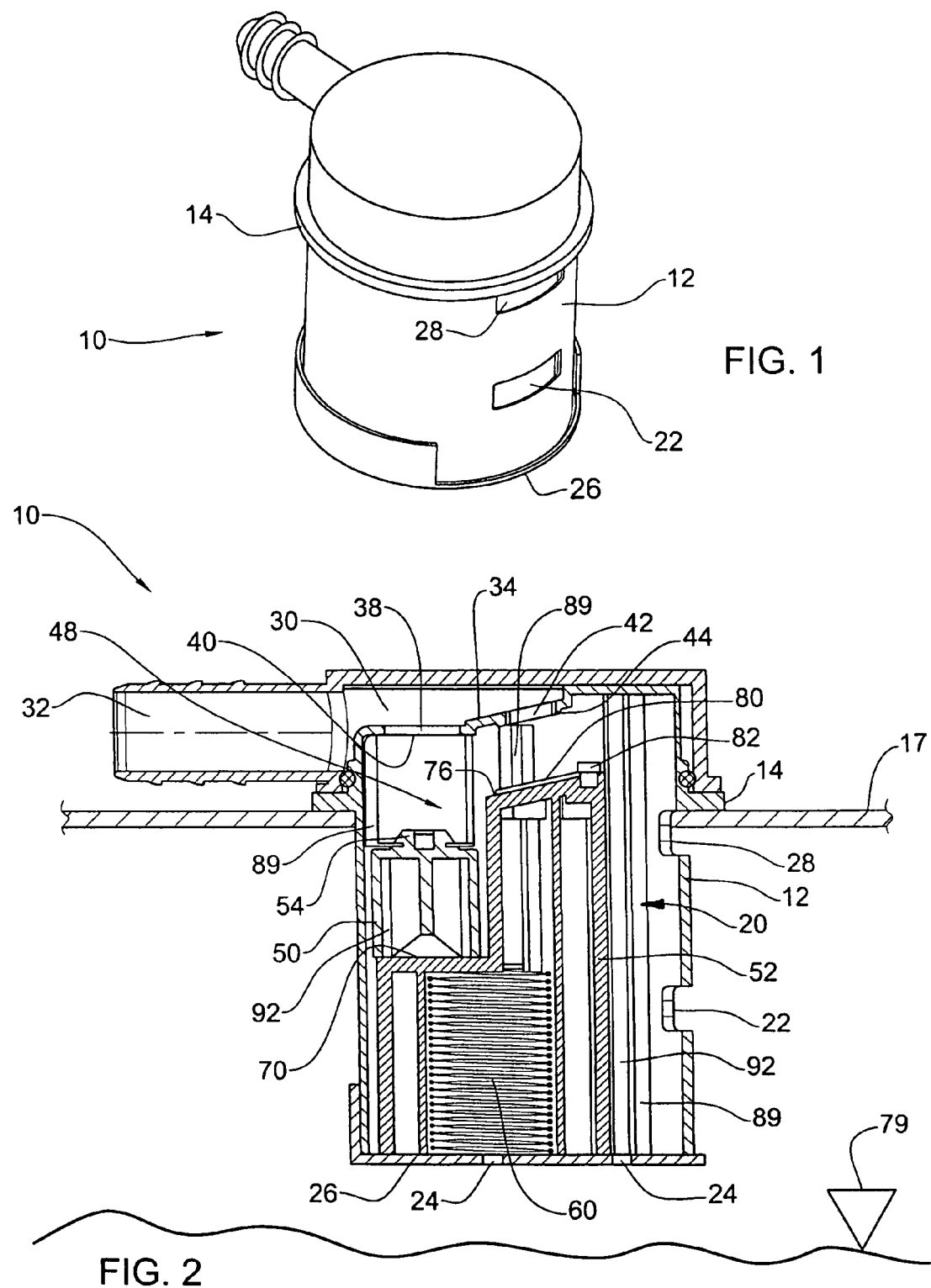

DUAL FUNCTION VALVE FOR FUEL TANK

FIELD OF THE INVENTION

The present invention is generally in the field of fuel tank valves and in particular, it is concerned with a dual float valve for use in vehicle fuel tanks having multi purpose functions.

BACKGROUND OF THE INVENTION

A large variety of valves for use with vehicles' fuel tanks are known, among which are of more relevance with respect to the present invention those fitted with two or more valve assemblies.

For example, U.S. Pat. No. 6,675,779 discloses a tank venting apparatus or a fill-limit and tank ventilation valve is disclosed for use with a fuel tank. The valve has a housing which contains a first valve assembly, second valve assembly, third valve assembly and fourth valve assembly. The first valve assembly primarily communicates with the fuel tank. The fourth valve assembly communicates with a vapor recover canister and a filler neck to the tank. The first valve assembly also communicates with the third valve assembly and the second valve assembly. The second valve assembly generally communicates with the first valve assembly and the third valve assembly. The third valve assembly communicates with the first valve assembly, second valve assembly and fourth valve assembly. The third valve assembly prevents passage of liquid fuel from the tank to the canister. The fourth valve assembly manages flow from the valve.

U.S. Pat. No. 6,240,950 is directed to a vapor control valve includes first, second, and third valves and a housing formed to include first, second, and third chambers and first, second, and third apertures. The first valve is formed to include a vent aperture and is movable relative to the first aperture to partially close the first aperture to limit flow from the first chamber to the second chamber through the first aperture. The second valve is movable relative to the first valve to open and close the vent aperture and cooperates with the first valve to close the first aperture to prohibit flow from the first chamber to the second chamber through the first aperture in response to rising liquid fuel. The third valve is biased to normally close the third aperture and configured to open the third aperture in response to pressurized fuel vapor to permit flow from the second chamber to the third chamber through the third aperture. The vapor control valve includes a blocker coupled to the second valve and configured to extend through the first aperture into the third chamber to contact the third valve to maintain closure of the third aperture by the third valve when the first aperture is closed by the first and second valves.

U.S. Pat. No. 5,797,434 is concerned with an onboard vapor recovery system for a vehicle fuel system having a fuel tank, a filler neck dynamically sealed by high pressure fuel flow from a filler nozzle, and a vapor recovery apparatus such as a carbon canister. The system preferably uses an inventive liquid level operated control valve which shuts off refueling with a two-stage closing operation providing an initial soft shutoff and a final shutoff. The system also preferably includes a valve in the fuel tank to maintain a predetermined pressure head sufficient to hold the system closed against further refueling at least temporarily, and a positive action, one-way check valve in the lower end of the filler pipe to prevent spitback of fuel from the pressurized tank once refueling has ceased.

Another arrangement directed to a over-filling preventing valve is disclosed in U.S. Patent Application No. 2003/0189110 directed a fuel valve includes an upper chamber communicating with a ventilation passage of a canister; a lower chamber to be disposed inside a fuel tank; a communicating port between the upper chamber and the lower chamber; and a float member disposed in the lower chamber for blocking the communicating port when fuel flows into the lower chamber. The lower chamber includes a one-way valve formed at a bottom thereof for allowing the fuel to flow out only through the one-way valve, and a fuel inlet formed in a side wall of the lower chamber. When a fuel level inside the fuel tank reaches the main fuel inlet, the fuel flows into the lower chamber to raise the float member. As a result, an internal pressure of the fuel tank increases, so that a sensor at a fueling nozzle side can detect that the fuel tank is filled-up.

U.S Patent Application No. 2002/0144730 discloses a vent apparatus is adapted for use with a fuel tank to control venting of fuel vapor from the fuel tank. The vent apparatus comprises a fuel vapor vent outlet to discharge fuel vapor from the fuel tank. The vent apparatus comprises a normally open first valve module to serve as a fuel fill limit valve and close when the liquid level in the tank reaches a predetermined fill limit and a normally open second valve module to serve as a fuel fill limit valve and close when the liquid level in the tank reaches the predetermined fill limit. The first valve module and the second valve module cooperate to block communication between the fuel tank and the fuel vapor vent outlet when the vent apparatus is positioned in a non-tilted orientation relative to a horizontal and the level of liquid fuel in the fuel tank reaches the predetermined fill limit to close both valve modules.

U.S Patent Application No. 2004/0003843 is directed to a valve where a first seal seat is disposed in a first passage of a case. The first float valve body is disposed in the case and closes the first seal seat in response to the liquid level of the fuel. The second seal seat is disposed vertically above the first seal seat, in a second passage of the case. The second valve body is disposed on one side of the second seal seat communicating to the outside of the second passage, with being resiliently urged upwards from below. The second float is disposed in the case and regulates an upper end position of the second valve body to open the second valve seat in response to movement of the liquid level of fuel at least until the liquid level is higher than the liquid level at which the first float valve body closes the first seal seat.

U.S. Pat. No. 5,738,132 discloses a roll over vent valve (ROV) comprising a housing formed with an inlet and an outlet, said outlet comprising a slit-like aperture, and a float member located within the housing axially displaceable between said inlet and said outlet. An elongated flexible closure member strip is anchored at one end thereof adjacent said outlet and a spring biases the float member in direction of said outlet. The arrangement is such that the spring biasing force together with buoyancy forces acting on the float member tend to press the membrane strip into sealing engagement with the outlet aperture and gravity forces acting on the float member tend to displace the float member away from the outlet so as to progressively detach the strip from sealing engagement with said outlet.

However, displacement of the float member into the sealing position occurs rapidly wherein said outlet aperture is spontaneously sealed as the closure membrane strip rests against a valve seating of said outlet. In addition, disengagement of the closure membrane strip from the valve seating might be somewhat delayed, in particular under high pressure. Even more so, this valve is not suitable for discharge of fuel vapor at high flow rates.

It is an object of the present invention to provide a two-float, multi functional valve, for use in vehicle fuel tanks which valve simultaneously serves as an over filling interdiction valve (OFI), a vapor recovery valve, a roll over valve (ROV), a filling limit vent valve (FLVV), an onboard refueling vapor recovery valve (ORVR) and as vent valve.

It is a further object of the present invention to provide a valve of improved design wherein displacement into its sealing position does not generate a pressure shockwave within the fuel tank on the one hand, and, on the other hand, provides opening of the valve, even under essentially high pressure.

SUMMARY OF THE INVENTION

In accordance with the present invention there is provided a valve for use, in particular, with vehicles' fuel tanks the valve comprising:

a housing defining a confined space formed with one or more fluid inlets to said confined space, a fluid outlet chamber at top end of said housing and being in flow communication with an outlet duct; a first outlet port extending between said confined space and said fluid outlet chamber, and a second outlet port extending between said confined space and said fluid outlet chamber;

a valve assembly located within the confined space and comprising a first stage float member associated with said first outlet port, and a second stage float member associated with said second outlet port, said float members being displaceable within the confined space about parallel axes, between an open position and a closed position of the respective first and second outlet port; wherein said first stage float member at least partially overlaps over said second stage float member.

The fluid outlet chamber of the valve is typically connected by suitable piping to a vapor recovery device, e.g. a canister, etc.

According to a modification of the present invention, there is provided a refueling cutoff assembly extending in a fluid venting flow path between the first and second outlet ports and the fluid outlet chamber; said assembly comprising a diaphragm having a top face thereof (designated with pressure $P_2$) in flow communication with a filler neck of the fuel tank, and a bottom face thereof exposed to pressure within the valve (designated with pressure $P_1$), said diaphragm having a bleeding aperture extending between faces of said diaphragm. Said fluid venting flow path being normally closed by the diaphragm, being biased into said closed position by a biasing spring.

The arrangement is such that as long as the filling neck is closed (by the fuel cap), the diaphragm is at pressure equilibrium ($P_2=P_1$), i.e. pressure over both faces thereof is substantially equal owing to the bleeding aperture. However, upon opening the fueling cap, the pressure at the top face equals with the surrounding pressure ($P_2=0$). Owing to vapor pressure within the tank and upon refueling, pressure at the bottom face of the diaphragm is higher ($P_1>0$), resulting in displacement of the diaphragm into opening said fluid venting flow path.

In order to ascertain pressure built up in the fuel tank during fueling, for causing fuel to rise in the filler neck of the tank, and to cutoff fueling by an automatic fuel nozzle, as known per se, there is typically provided a pressure holding member in the form of a mass sealing the second outlet port. Said pressure holding member displaces into an open position only upon pressure built-up over a predetermined value or upon acceleration of the vehicle.

By one particular design the second stage float member has a cross-section occupying at a lower portion thereof substantially the entire cross section of the valve's housing, resulting in increased buoyancy forces acting on said second stage float member, imparting it improved closing force and tracking liquid level within the fuel tank (i.e. axial displacement within the housing corresponding with liquid level changes and waves).

A biasing member is typically fitted within the confined space acting in direction so as to displace the second stage float member, and consequently the first stage float member, into their respective closed positions. This is important for rollover positions, so as to close the first and second outlet ports.

The arrangement in accordance with the present invention is such that at an upright position of the valve, buoyancy forces acting on the second stage float member, together with the biasing member, tend to displace the second stage float member and the first stage float member into their respective closed position where the valve is sealingly closed, whilst gravity forces acting on the second stage float member tend to displace it into its open position, entailing delayed displacement of the first stage float member into its open position. At a downright position of the valve or at a substantially inclined position thereof, e.g. upon rollover of the vehicle, the first stage float member and the second stage float member are instantaneously displaced into their respective closed positions so as to seal the valve, under influence of the biasing spring.

Optionally the first stage float member is anchored to the second stage float member, wherein displacement of the second stage member into its open position entails displacement of the first stage member into its open position. The anchoring being facilitated, by one or more flexible or rigid anchoring members extending between said float members.

The arrangement is such that the length of the one or more anchoring member extending between the first and second stage float members, ensures that when the second stage float member is in rest adjacent a bottom end of the valve's housing, the first stage float member is in its open position.

In accordance with one particular embodiment, the anchoring member extending between the two stage float members is one or more leg portions extending from one of the first stage float member and the second stage float member and being slidingly engaged with the other of said first stage float member and the second stage float member. Alternatively, the anchoring member is one or more flexible cords extending between the first and second stage float members.

Some optional features of the valve according to the present invention are, for example, any one or more of the following:

the shut-off level of the second outlet port is lower then the shut-off level of the first outlet port;

an uppermost inlet of the one or more fluid inlets in the housing, determines the maximum fuel level within the tank, namely when liquid in the tank reaches this level thus, the valve closes resulting in fuel filling cut-off.

in order to improve sealing of the valve in the closed position, a resilient sealing member is provided on either or both of the first and second valve seating and the respective first and second stage member;

the first stage float member and the second stage float member are rotatably restrained within the housing;

an anti-splash skirt may be fitted to prevent fuel splashing during motion of the vehicle;

the first outlet port has a substantially greater section area then the second outlet port.

By a particular application of the invention the second stage float member is a float fitted with a flexible closure membrane strip anchored at one end thereof to a top wall of said float member, said closure membrane facing the outlet aperture of the second outlet port; the second stage float member being displaceable between a first position in which the closure membrane sealingly engages said inlet aperture, and a second position in which it is progressively disengaged therefrom.

Optionally, the second outlet port is formed at a bottom side thereof with a substantially elongated slit-like inlet aperture.

For improving shifting of the valve into its open position, also at essentially high pressures residing within the fuel tank, the outlet aperture of the second outlet port is inclined with respect to a longitudinal axis of the housing. Correspondingly, a top surface of the second stage member bearing the closure membrane is substantially equally inclined with respect to said longitudinal axis, whereby said closure membrane, when in sealing engagement with said outlet aperture, is pressed along its length against the outlet aperture by said inclined surface of the second stage float member.

BRIEF DESCRIPTION OF THE DRAWINGS

For better understanding the invention and to show how it may be carried out in practice, some embodiments will now be described, by way of a non-limiting examples only, with reference to the accompanying drawings, in which:

FIG. 1 is a top perspective view of a valve in accordance with a first embodiment of the present invention;

FIG. 2 is a longitudinal sectioned through the valve in FIG. 1, the valve in its fully open position, in which the first stage float member and the second stage float member are in their respective open position;

DETAILED DESCRIPTION OF A PREFERRED EMBODIMENT

Figure 3:
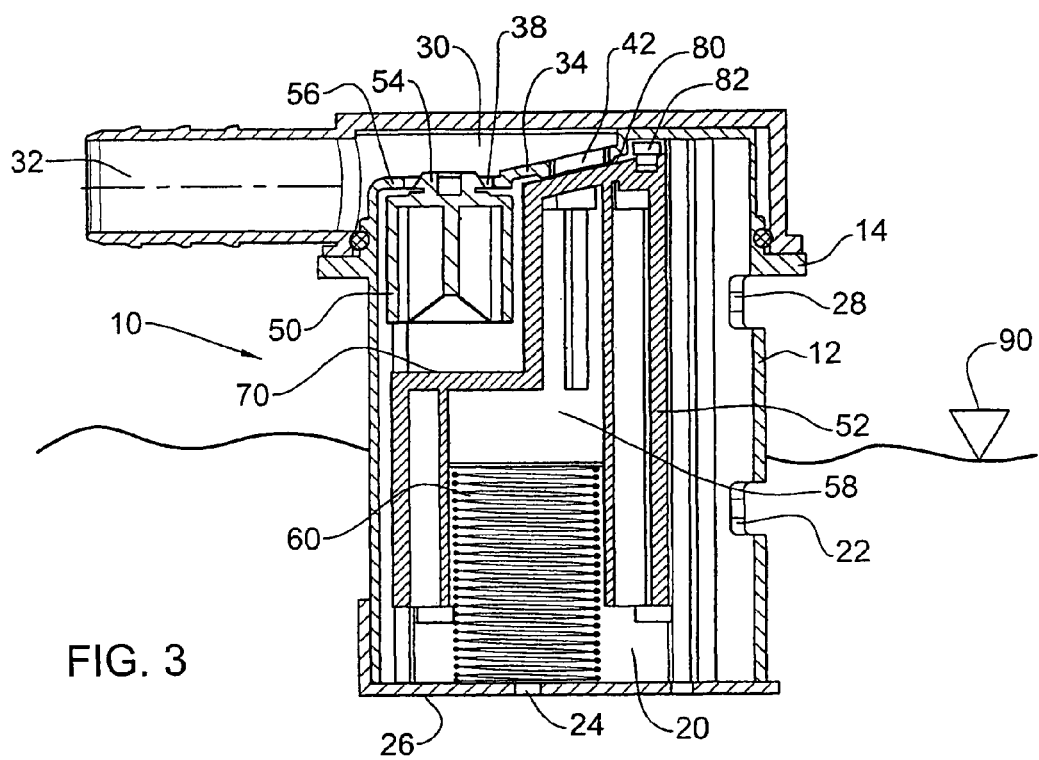
FIG. 3 is a longitudinal sectioned through the valve in FIG. 1, the valve in its fully closed/sealed position, in which the first stage float member and the second stage float member are in their respective closed position.

Attention is first directed to FIGS. 1 and 2 for understanding the construction of a valve according to a first embodiment of the present invention, generally designated 10. The valve comprises a cylindric housing portion 12 formed with a flange 14 at an upper portion thereof for attachment, by heat welding or other means as known in the art, to an upper wall portion 17 of a fuel tank (not shown), where a major portion of the housing 12 extends into the fuel tank. As will be discussed hereinafter in connection with the embodiment of FIG. 6, there is illustrated a valve formed with a different arrangement for attachment to the fuel tank.

Figure 4:
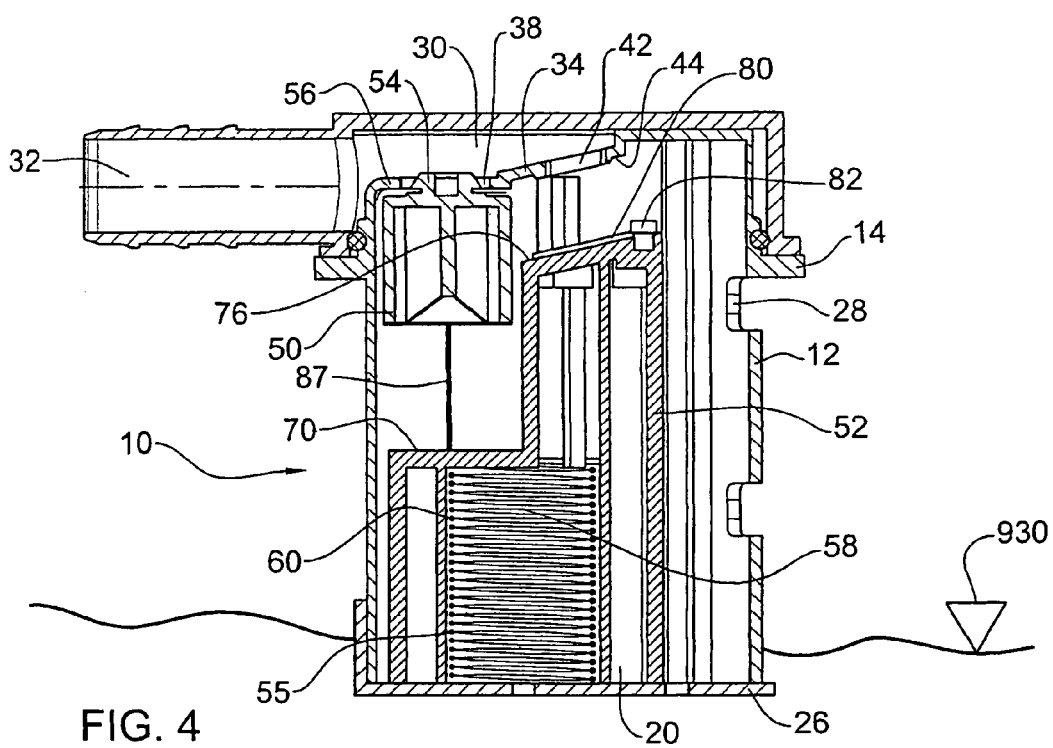
FIG. 4 is a longitudinal sectioned through the valve in FIG. 1, the valve in its partially open position, in which the first stage float member is in its closed position whilst the second stage float member is in its open position.

As can further be seen in FIGS. 2 to 4, the housing 12 defines a confined space 20, a lower fluid inlet 22, several fluid inlets 24 at a bottom wall 26 of the housing, and at a top end of the confined space, an upper inlet port 28.

The valve 10 is formed at an upper portion thereof with a fluid outlet chamber 30 being in flow communication with an outlet duct 32 of the valve, where said fluid outlet chamber 30 is sealingly partitioned from said confined space 20 by a partition wall 34 formed with a first outlet port 38, bounded by a first valve seating 40, and a second outlet port, which in the present example is in the form of an elongate slit-like inlet aperture 42, bounded by a second valve seating 44 having an inclined bottom surface.

Axially displaceable within the confined space 20 there is provided a valve assembly generally designated 48 and comprising a first stage float member 50 associated with said first outlet port 38, and a second stage float member 52 associated with said second outlet port 42.

The first stage float member 50 has at a top end thereof a tapering projection 54 receivable within first valve seating 40 for proper positioning therein, with a resilient sealing member 56 mounted thereover, adapted for sealing engagement with the valve seating 40 of partition wall 34 (position seen in FIGS. 3 and 4).

The second stage float member 52 is a double-walled float member defining an annular spring receptacle 58, supporting a coiled spring 60 bearing at a bottom end against bottom wall 26 of the housing and at its top end against a shoulder of the second stage float member 52.

The second stage float member 52 has a double decked top wall, a lower deck 70 extending at least partially below and sized for supporting the first stage float member 50 when at its open position as in FIG. 2, and an upper deck 76 formed with an inclined support surface which is inclined substantially equally as the bottom surface of second valve seating 44 of second outlet port 42. A flexible closure membrane strip 80 is anchored, at one end thereof, by a spike 82, the purpose of which will become apparent hereinafter.

It is according to a desired application of the present invention that the first stage float member 50 be articulated to the second stage float member 52 by a retracting/anchoring arrangement to ensure that the first stage float member 50 disengages from the valve seating 40 of the first outlet port 38. Such a retracting arrangement is for example a flexible cord 87 (FIG. 4) extending between the first stage float member 50 and the second stage float member 52 and having a length slightly less than the distance between the float members when the first stage float member 50 is in a closed position and the second stage float member 52 is in the open position. A different arrangement is disclosed with reference to the embodiment illustrated in FIGS. 8 to 11.

Figure 5A:
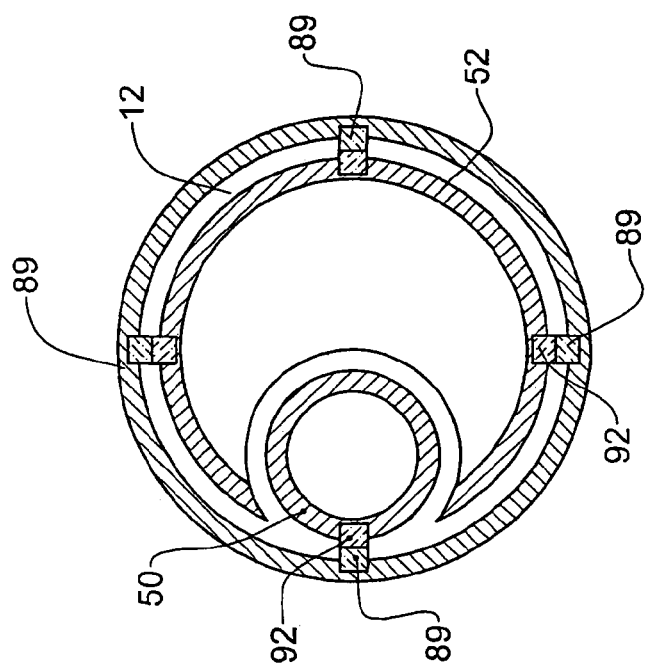
FIG. 5A is a sectional view along line II—II in FIG. 2.

As can further be seen in FIG. 5A, the first stage float member 50 and the second stage float member 52 are both rotatably restrained with respect to one another and with respect to the housing 12, so as to ensure correct positioning of the inclined surface of the upper deck 76 and the second valve seating 44 of the second outlet port 42, and to prevent displacement of the first stage flat member 52 with respect to the valve seating 40 of the first outlet port 38. Such restriction is obtained by longitudinal ribs 89 extending along the inner walls of the housing 12 slidingly received within corresponding grooves 92 formed at side walls of the first and second stage float member, respectively. According to the particular design illustrated in FIG. 5A, the second stage float member 52 embraces, at least partially, the first stage float member 50.

Figure 5B:
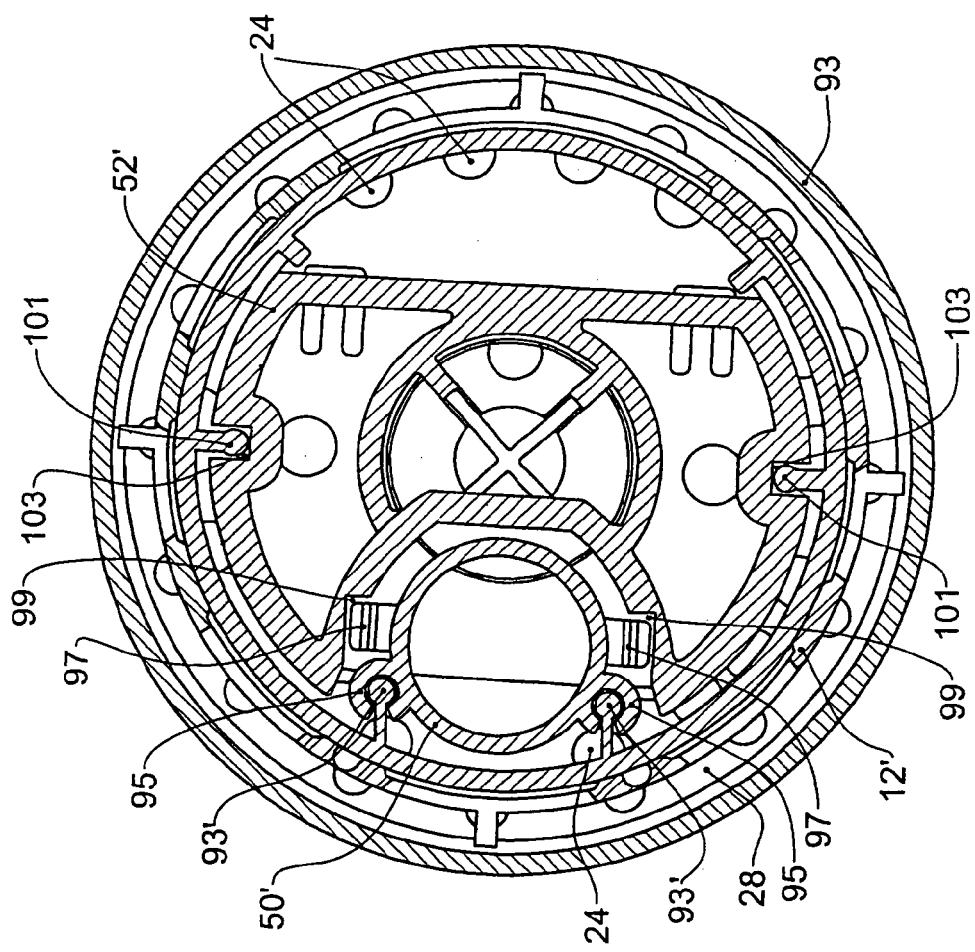
FIG. 5B is a sectional view along line II—II in FIG. 2, according to a different embodiment.

In the modification illustrated in FIG. 5B the housing 12' of the valve is fitted with an enveloping anti-splash skirt 93 (seen also in the embodiment of FIG. 6 where the skirt is designated at 102), wherein the housing 12' is fitted with a pair of axially extending rails 93' and the first stage float member 50' is formed in turn with a pair of corresponding followers 95 for sliding engagement with said rails 93'. The first stage float member 50' is further fitted with a pair of lateral projections 97 slidingly received at corresponding groves 99 formed in the second stage float member 52' furthermore, the housing 12' is formed with two radial inward projections 101 slidingly received within corresponding longitudinal grooves 103 formed in the second stage float member 52'. This arrangement ensures that the first and the second stage float members are displaceable only axially.

Attention is further directed to FIGS. 2 to 4 for understanding how the valve operates under different conditions.

FIG. 2 illustrates a position of the valve where fuel level 79 within the fuel tank does not reach the bottom end of the valve assembly 48, namely the bottom end of the second stage float member 52, and the valve is thus considered to be in its fully opened position wherein the first stage float member 50 and the second stage float member 52 are in their downward position, i.e. disengaged from the first outlet port 40 and second outlet port 42, respectively (referred to as the 'open position'). At the absence of buoyant forces and under influence of gravity, the coiled spring 60 is depressed. In this position, fuel vapor is free to flow via fluid inlet 22, 24 and via inlet port 28 through confined space 20 and out through first and second outlet ports 38 and 42, and then via fluid outlet chamber 30 to the outlet duct 32, which is typically connected through suitable piping to a vapor treating/recovery device, typically a canister (not shown).

It is noted that the apertures of the fluid inlets 22, and of the inlet port 28 and at least the first outlet port 38 are of significantly large cross-sections so as to allow evacuation of fuel vapor also at high flow rates. This is an important feature which plays a role during fuel filling.

With further reference to FIG. 3, as fuel level 90 increases within the fuel tank, fuel enters the confined space 20 of the valve via the fluid inlets 22, 24 via inlet port and 28 wherein the spring biasing force applied by spring 60, together with the buoyancy forces acting on the second stage float member 52 tend to raise the valve assembly 48 consequently as the fuel level raises within the tank. As the second stage float member begins its ascend, it entails also displacement of the first stage float member 50 until the fuel level within the confined space 20 raises to a stage wherein both the first stage float member 50 and the second stage float member 52 are biased into an uppermost position and sealingly engage the valve outlet ports 38 and 42, respectively.

In the closed position (FIG. 3), the closure membrane strip 80 of the second sage float member 52 sealingly engages the second valve seating 44 of second outlet port 42 and the resilient sealing member 54 of the first stage float member 50 sealingly engages the first valve seating 40 of the first outlet port 38. In this position the valve is in its so-called closed position, prohibiting liquid or vapor egress via outlet ports towards the outlet chamber 30.

Typically the second stage float member 52 is first to engage a sealing position and only shortly after this the first stage float member 50 engages into its sealed position owing to buoyancy forces acting thereon. This arrangement reduces generation of a shock wave which would otherwise occur upon sudden shut-off.

Upon fueling, and a the valve engages into its sealed position of FIG. 3, pressure builds up within the fuel tank resulting in fuel level rising within a filler neck of the fuel tank (not shown) entailing cut-off of the filling assembly as a result of contact of the filling nozzle (not shown) with fuel within the filler neck.

Turning now to FIG. 4 of the drawings, there is illustrated a intermediate position wherein liquid level 930 within the confined space 20 slightly drops, allowing displacement of the second stage float member 52 downwards into its open position, that owing to absence of upwardly directed buoyancy forces and overcoming the upwardly directed biasing effect of the coiled compression spring 60, and resulting in corresponding displacements of the first stage float member 50 into its open position, that owing to the retracting cord 87. Eventually, the first stage float member 50 continues to displace into its initial position as in FIG. 2 where it comes to rest over the lower deck 70 of the second stage float member 52.

Figure 6:
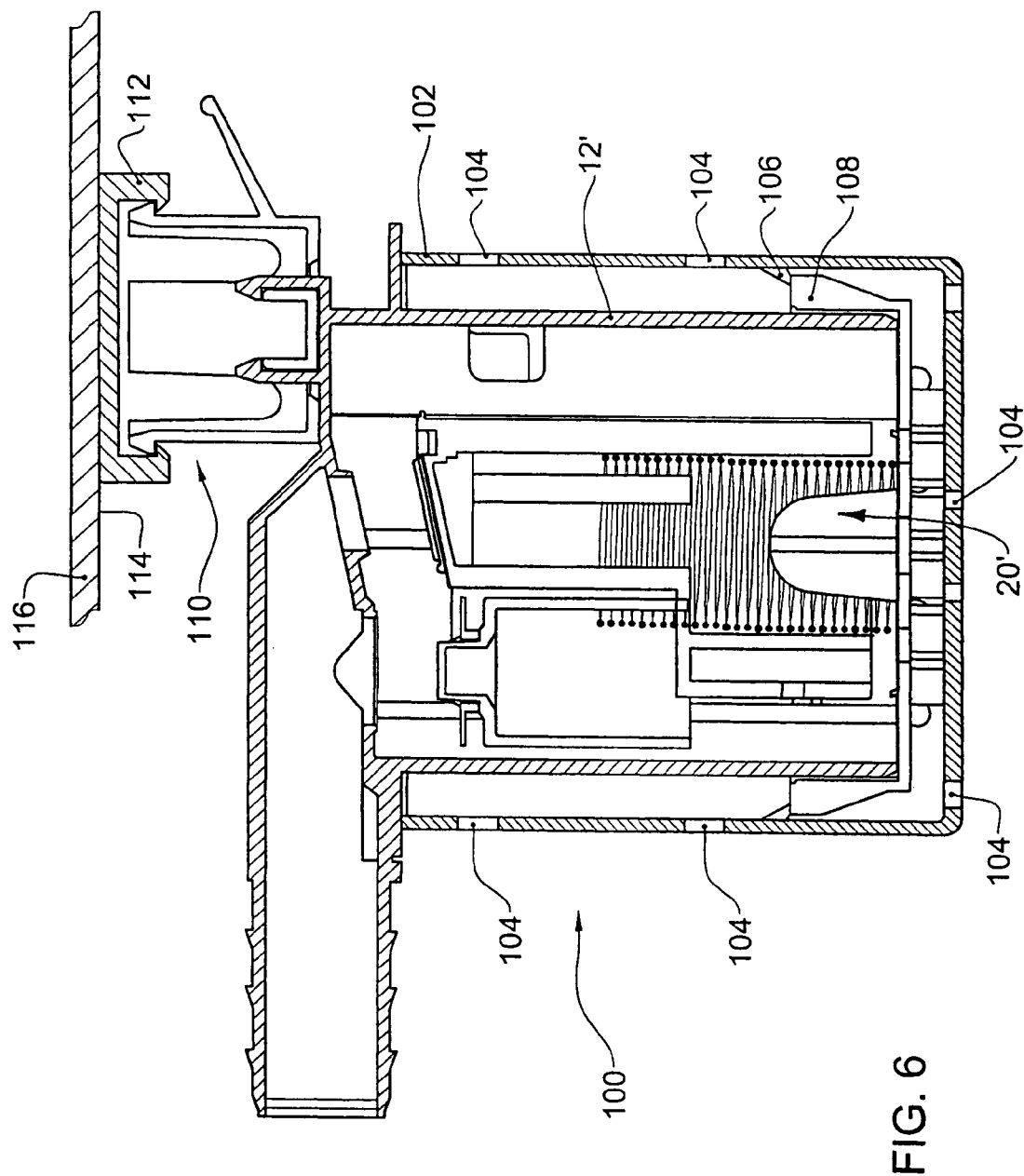
FIG. 6 is a longitudinal section through a valve according to the first embodiment, in its fully open position, illustrating several modifications thereto.

Turning now to the embodiment of FIG. 6, there is illustrated a valve in accordance with a modification of the first embodiment and generally designated 100 comprising two main differences, namely, the cylindric housing 12' is fitted with an enveloping cylindric anti-splash skirt 102 formed with a plurality of apertures 104 to allow easy fluid flow therethrough into the valve's confined space 20'. The anti-splash skirt may be provided as an integral component of the housing or may be attached thereto, e.g. by snap-type fixtures 106 of the skirt 102 and corresponding snaps 108 of the housing 12'.

Furthermore, the valve 100 is fitted for installing within the tank, without any portion thereof projecting outside. This is accomplished by means of a snap-type fixture 110 snappingly engageable with a retention member 112 integrally formed or welded at a bottom surface 114 of an upper tank wall 116, a portion of which is illustrated in FIG. 6. This type of connection ensures minimal fuel vapor permeation as required under various standards.

Further attention is now made to FIGS. 7 to 13, directed to a second embodiment of a valve in accordance with the present invention generally designated 130. The valve is of the type comprising an outlet duct 136 connected to a fuel vapor treating device, e.g. canister 138 via suitable tubing 140, and further comprising a venting port 146 being in flow communication with a filler neck 148 of a fuel tank 150 via a suitable piping 154

For the sake of convenience, elements in the valve which are similar to elements disclosed in connection with the previous embodiment of FIGS. 1 to 5 are designated with the same reference numbers shifted by 200.

Figure 7A:
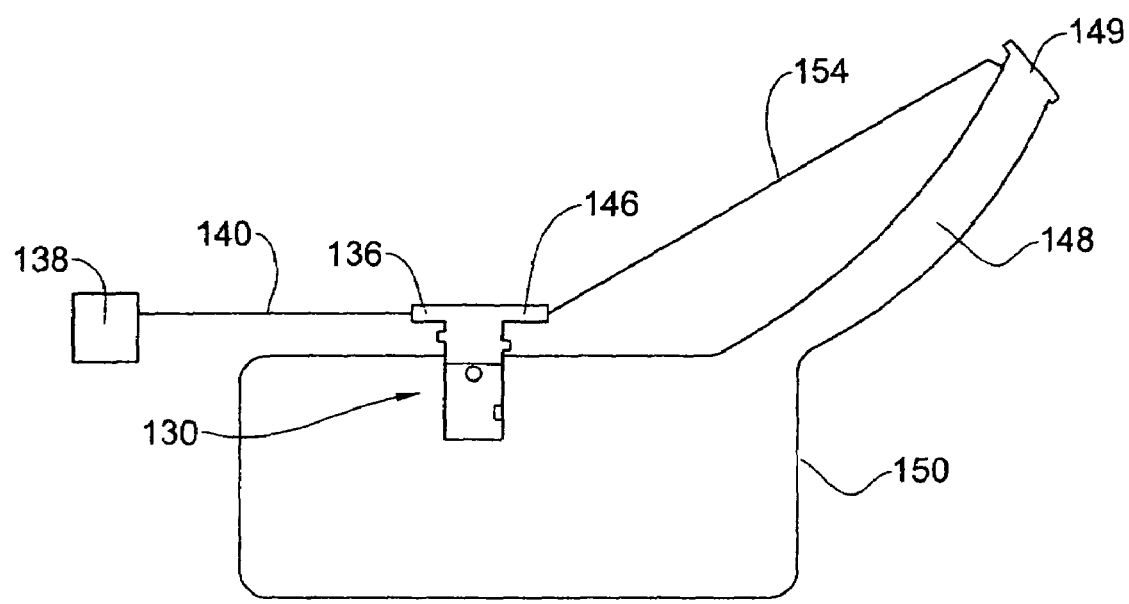
FIG. 7A is a schematic representation of a vehicle's fuel system, fitted with a valve according to a another embodiment of the present invention.
Figure 7B:
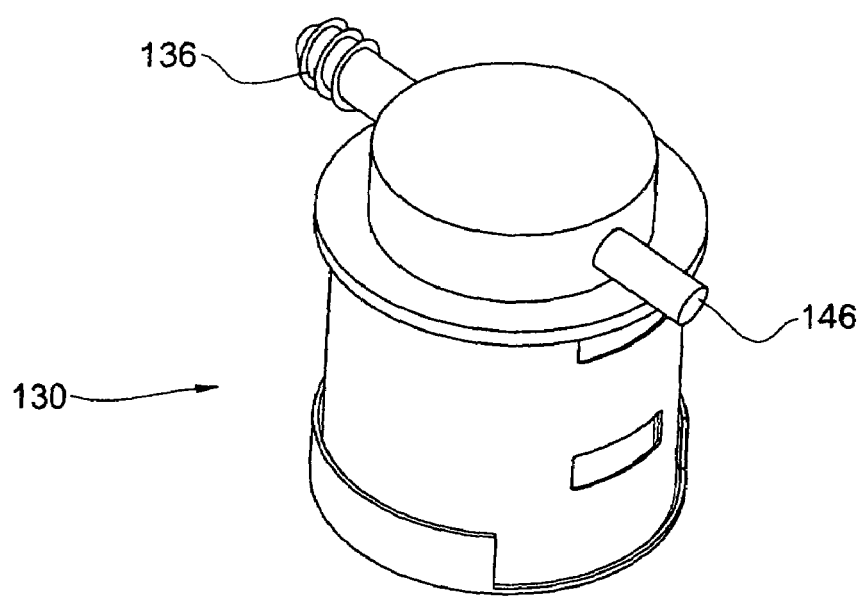
FIG. 7B is a top perspective view of the valve schematically represented in FIG. 5A.
Figure 8:
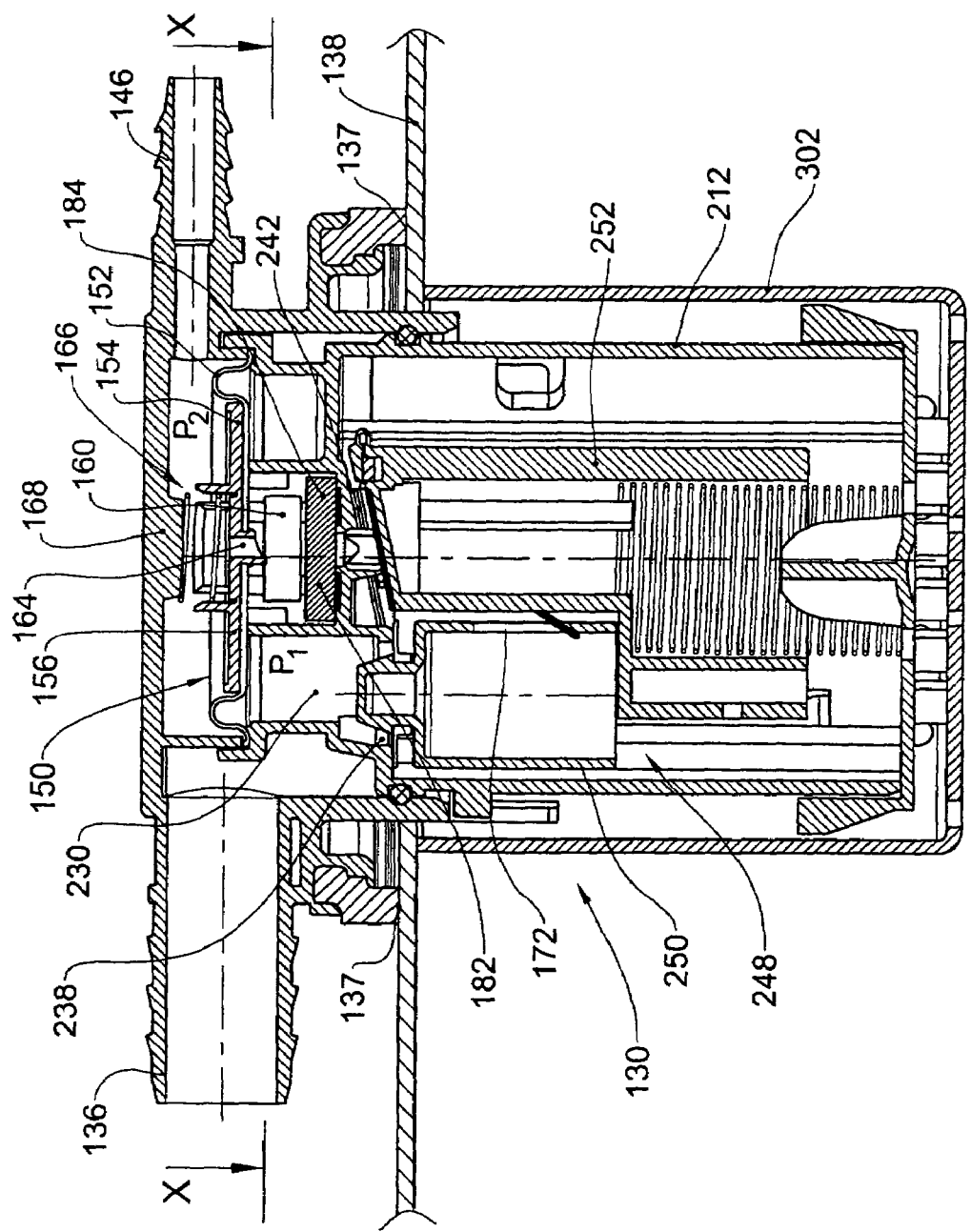
FIG. 8 is a longitudinal sectioned through the valve in FIG. 7B, the valve in its fully closed/sealed position, where the first stage float member and the second stage float member are in their respective closed position.
Figure 9:
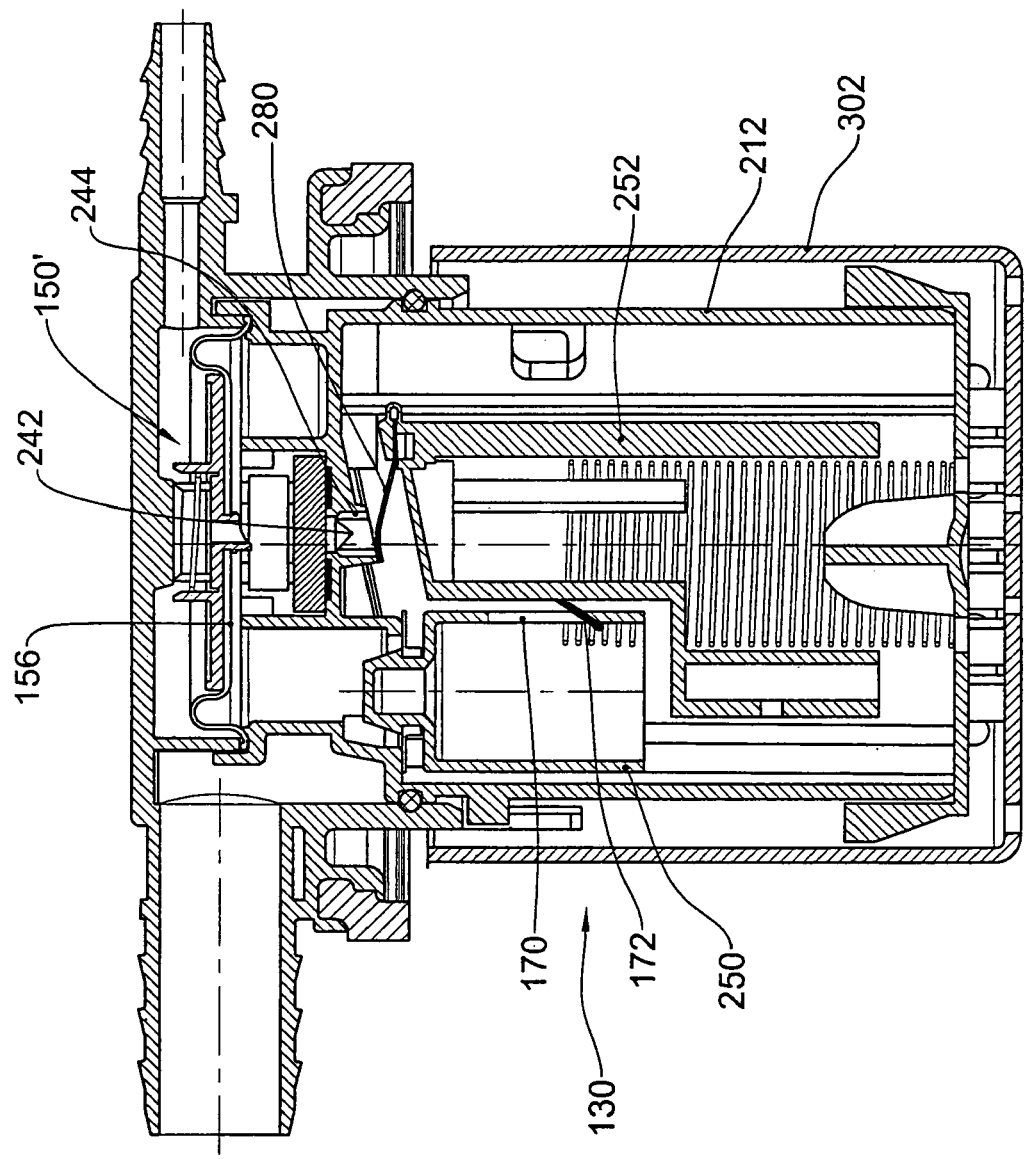
FIG. 9 is a longitudinal sectioned through the valve in FIG. 7B, wherein the second stage float member is fitted with a peal away membrane; the valve illustrated at a first opening stage, gradually displaceable into its open position.
Figure 10:
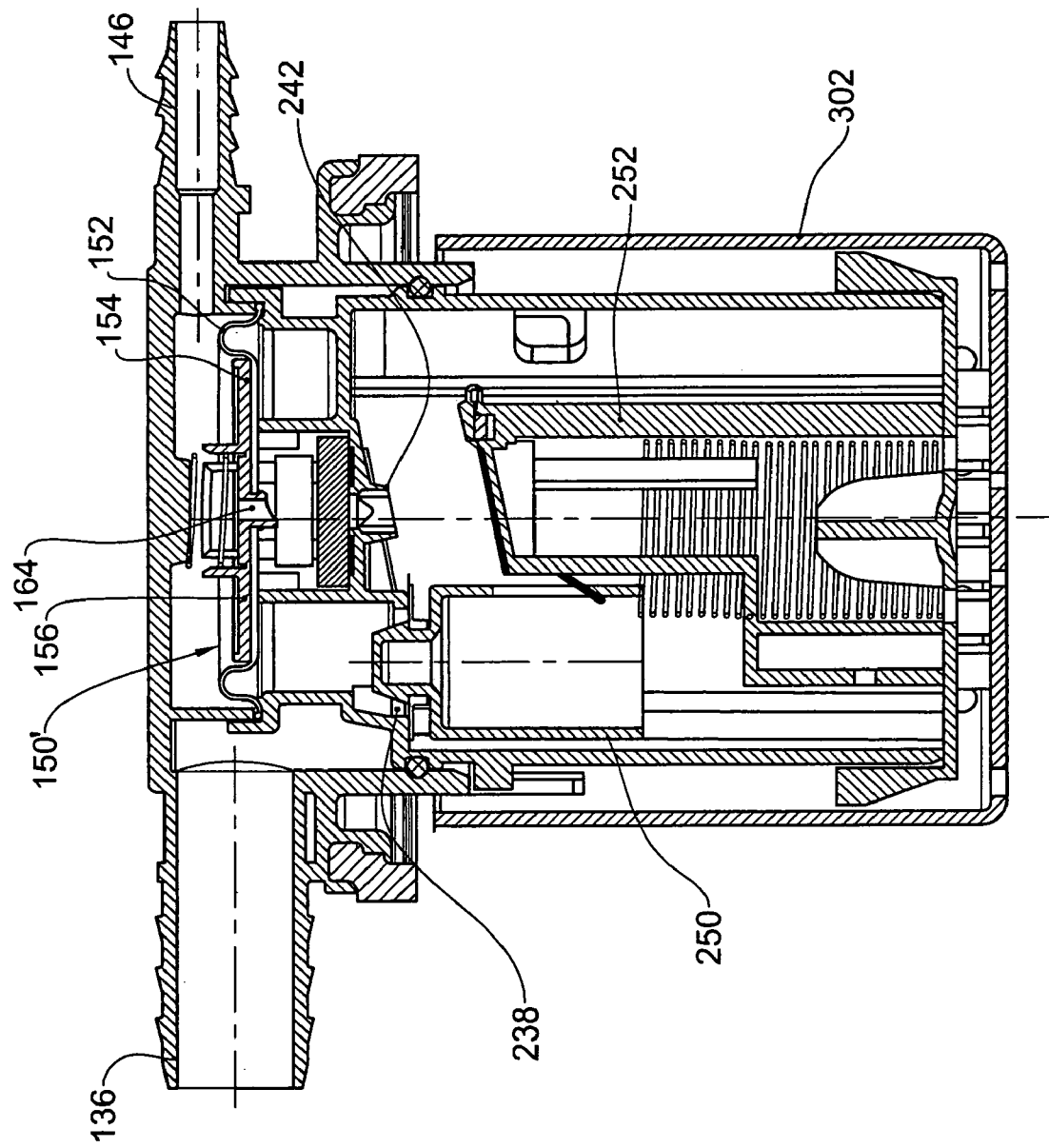
FIG. 10 is a longitudinal sectioned through the valve in FIG. 7B, the valve in its partially open position, in which the first stage float member is in its closed position whilst the second stage float member is in its open position.
Figure 11:
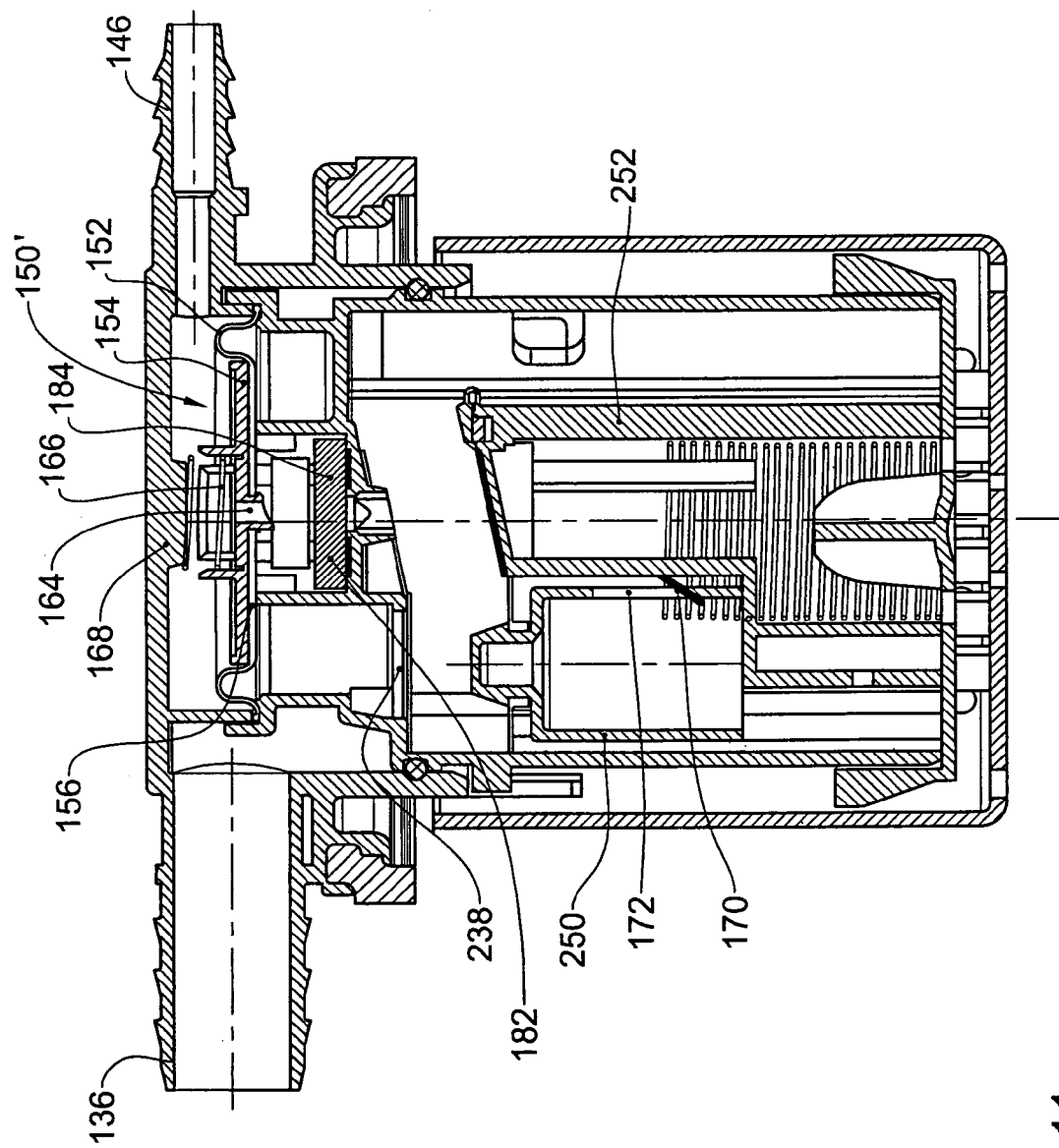
FIG. 11 is a longitudinal sectioned through the valve in FIG. 7B, the valve in its fully open position, in which the first stage float member and the second stage float member are in their respective open position; and further with a refueling cutoff assembly in an open position.
Figure 12:
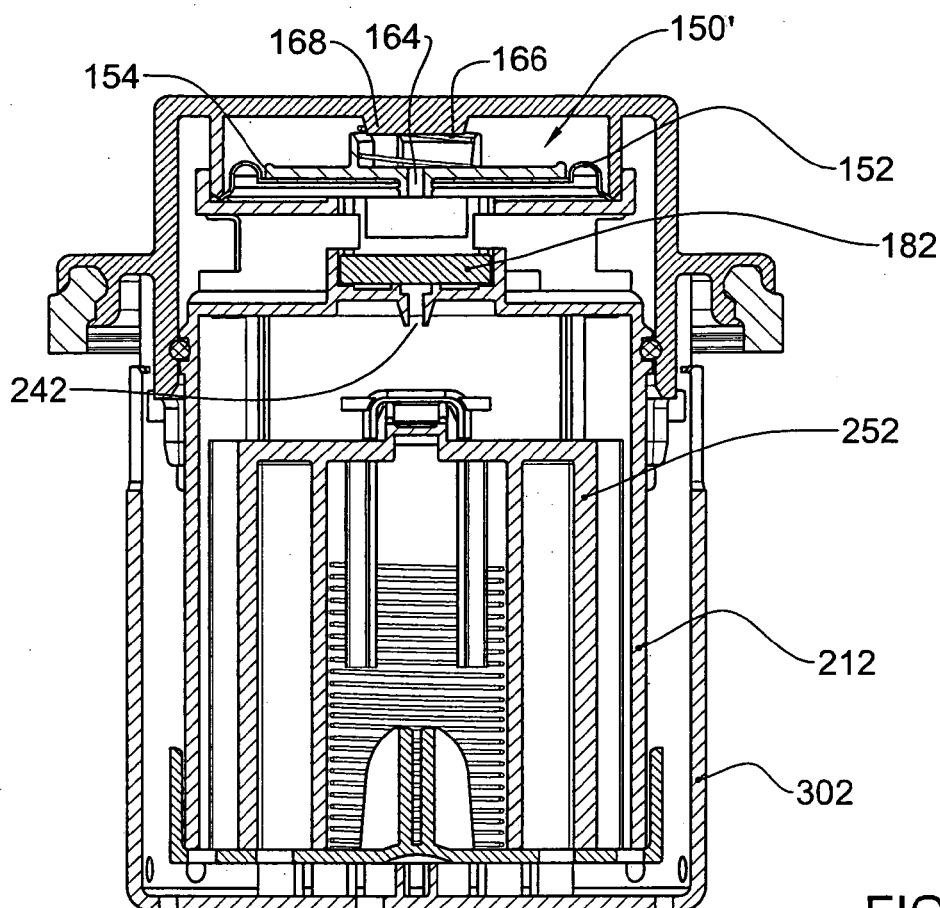
FIG. 12 is a longitudinal section of the valve in a position as in FIG. 10, along a plane rotated by 90°.
Figure 13:
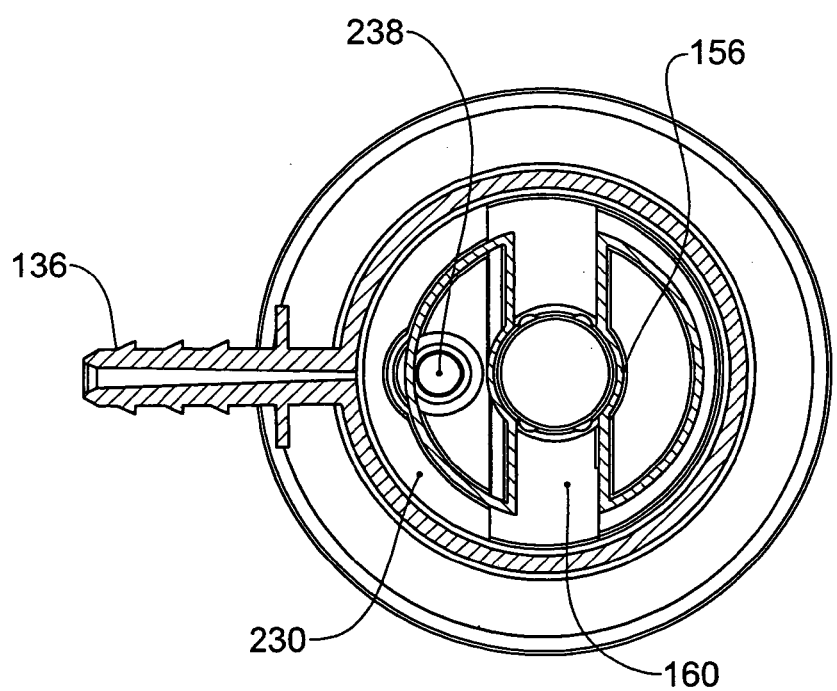
FIG. 13 is a plan section along line X—X in FIG. 8.

The valve 130 similar to the previous embodiment comprises a cylindric housing 212 fitted with a first stage float member 250 and the second stage float member 252 substantially of the same structure as defined in connection with the first embodiment. An anti-splash skirt 302 is articulated to the housing 212 in the same fashion as disclosed in connection FIG. 6. The valve 130 is of the type fitted for external mounting as illustrated in FIG. 7a and is fitted for heat welding at 137 to top wall surface 138 of the fuel tank 150 (FIG. 7a).

An upper portion of the fuel valve 130 comprises a fuel chamber 230 being in flow communication with the first outlet port 238 and with the second outlet port 242 however through a refueling cutoff assembly generally designated 150'. The cutoff assembly comprises a diaphragm 152 bearing a rigid disk member 154', said diaphragm displaceable between a closed position as in FIG. 8 in which it is sealingly depressed over a fluid venting flow path 156, and an open position, as in FIG. 9 wherein said fluid venting flow path 156 is open to facilitate fluid flow from the first and second outlet ports towards the outlet chamber 230 via a path defined at 160 (see also FIGS. 12 and 13).

A top face of the diaphragm 152 is exposed to pressure $P_2$ and a lower face of the diaphragm is exposed to pressure $P_1$ residing within the valve A bleeding aperture 164 extends between the top face and the lower face. The diaphragm 152 is normally biased into its closed (sealing) position as in FIG. 8 by means of a coiled spring 166 bearing at one end against the rigid disk member 154 and at an opposed end against a spring seat 168 of a top wall of the housing.

The valve assembly 130 comprising the first and second stage float member 250 and 252 acts in a similar manner as disclosed in connection with the first embodiment. Accordingly, when the vehicle roles over, or in case of steep traveling (acceding or descending) or sideways inclined, the second stage float member 252 displaces into its sealing position, entailing corresponding displacement of the first stage member 250 into its sealing position (position of FIG. 8). This will also occur upon excessive fueling (over-filling). However, when fuel level within the tank drops, the second stage float member 252 begins to descend wherein the flexible closure member strip 280 progressively detaches from the second valve seating 244. Opening of the second outlet port 242 occurs even if the tank is under essentially high pressure owing to the progressive detachment of the flexible closure member strip 280 from the elongate slit-like aperture of the second outlet port 242.

Once the second stage float member 252 begins its descent, and after the membrane strip 280 disengages from the seating 244 of the second outlet port 242 pressure $P_1$ within the fuel tank and consequently within the valve 130 drops whilst the first stage float member 250 displaces downwardly (FIG. 1) by means of projection 170 extending from a side wall of the second stage member 252 projecting into a recess 172 formed in the first stage float member 250.

Alternatively, there may be provided anchoring leg members extending from the second stage float member 252 and slidingly received within suitable recesses formed in the first stage float member 250 the arrangement being such that downward displacement of the second stage float member 252 entails somewhat delayed downward displacement of first stage float member, though such displacement is ensured and will prevent the first stage float member 250 from maintaining its sealed position, to facilitate fluid flow through the first outlet port 238, also at significant flow rates.

As already mentioned hereinbefore, the first and second stage float members are slidingly articulated to one another whilst axial displacement with respect to one another is possible, however up to a limited extent, the limited extent being defined by the length of the anchoring members which may be in the form of a leg projections, flexible cord, etc.

The valve disclosed hereinabove will instantaneously and automatically seal/close in the case of rollover as the valve assembly, namely first stage float member 50;250 and the second stage float member 52;252 displace into sealing engagement with the respective outlet ports 38;238 and 42;242, respectively, owing to gravity forces when the vehicle is upside down.

As mentioned hereinbefore in connection with the second embodiment, there is provided a refueling cut-off assembly generally designated 150 and the arrangement is such that as long as the filling neck 148 is sealed by a fuel cap 149 (FIG. 7a) the diaphragm is at pressure equilibrium ($P_2=P_1$, i.e. pressure acting on one or both faces thereof) essentially equal owing to the bleeding aperture 164. In this position the diaphragm closes the fluid venting flow path 156 (FIGS. 8 and 11) owing to the biasing effect of the coiled spring 166. However, upon opening of the fueling cap 149, pressure at top face of the diaphragm 152 equals with the surrounding pressure ($P_2=0$) whilst vapor pressure normally residing within the tank, and further upon refueling, causes pressure at the bottom face of the diaphragm to increase ($P_1>0$) resulting in displacement of the diaphragm 152 into open position and opening the fluid venting flow path 156, as in the positions of FIG. 9.

Furthermore, in order to ascertain pressure built up in the fuel tank during fueling, for causing fuel to rise in the filler neck 148 (see FIG. 7a) and to cut off fueling by an automatic fuel nozzle (not shown), there is typically provided a pressure holding member in the form of a mass 184 (e.g. a metal disk) which normally sealingly rests over an outlet 182 of the second outlet port 242. The arrangement is such that the pressure holding member 184 displaces into an open position only upon pressure built up over a predetermined value (in case of a mass 182) or upon acceleration of the vehicle (e.g. in the case of an inverted cone-like aperture with a pressure holding member in the form of a fair—not shown).

While several embodiments of a valve in accordance with the present embodiment have been shown and described in the specification, it will be understood by an artisan that it is not intended thereby to limit the disclosure of the invention, but rather it is intended to cover all modifications and arrangements falling within the scope and spirit of the present invention, *mutatis mutandis*.

The invention claimed is:

1. An over filling interdiction, vapor venting and roll over multi-function valve comprising a housing defining a confined space formed with one or more fluid inlets to said confined space, a fluid outlet chamber at top end of said housing and being in flow communication with an outlet duct; a first outlet port extending between said confined space and said fluid outlet chamber, and a second outlet port extending between said confined space and said fluid outlet chamber; a valve assembly located within the confined space and comprising a first stage float member associated with said first outlet port, and a second stage float member associated with said second outlet port, said float members being axially displaceable by buoyancy forces within the confined space about parallel axes, from an open position in which said first and second outlet port is open to a closed position; in which said first and said second outlet port is respectively sealingly engaged by said first stage float member and by said second stage float member wherein said first stage float member at least partially overlaps over said second stage float member such that when said first stage float member is in its open position it is supported by the second stage float member, the arrangement being such that only displacement of the second stage float member from the open position into closed position the first stage float member can be displaced into its closed position and sealingly engage the first outlet port.

2. A valve according to claim 1, wherein the first outlet port is bounded by a first valve seating and the second outlet port is bounded by a second valve seating.

3. A valve according to claim 1, wherein the second outlet port has at a bottom face thereof an outlet aperture, and where the second stage float member is fitted with a flexible closure membrane strip anchored at one end thereof to a top wall of said second stage float member, said closure membrane facing said outlet aperture; wherein the second stage float member is displaceable between a first position in which the closure membrane sealingly engages said outlet aperture, and a second position in which it is progressively disengaged therefrom.

4. A valve according to claim 1, wherein the first stage member is axially articulated to the second stage float member by at least one anchor member extending there between, wherein displacement of the second stage float member into its open position entails displacement of the first stage float member into its open position.

5. A valve according to claim 4, wherein the length of the at least one anchor member ensures that when the first stage float member is in its open position, the second stage float member is in its second position.

6. A valve according to claim 4, wherein the anchoring member is configured as one or more leg portions extending from one of the first stage float member and the second stage float member and formed with a hooking portion; said leg portion being slidingly engaged with the other of said first stage float member and the second stage float member.

7. A valve according to claim 4, wherein the anchoring member is a flexible cord.

8. A valve according to claim 1, wherein a biasing member is located within the confined space for biasing the second stage float member into its open position.

9. A valve according to claim 1, wherein the housing is formed with a flanged portion for attachment to a fuel tank of a vehicle.

10. A valve according to claim 1, wherein an uppermost aperture of the one or more fluid inlets determines the maximum fuel level with in the tank.

11. A valve according to claim 1, wherein the first outlet port has a circular cross-section, and the first stage float member is fitted at a top thereof with a tubular projection sealingly receivable within said circular fluid outlet.

12. A valve according to claim 11, wherein the tubular projection of the first stage float member tapers upwardly.

13. A valve according to claim 1, wherein a resilient sealing member is provided on either or both of the outlet ports and first and second stage float members, whereby sealing engagement occurs when the float members are fully displaced into their respective closed position.

14. A valve according to claim 1, wherein the outlet aperture of the second outlet port is inclined with respect to a longitudinal axis of the housing.

15. A valve according to claim 14, wherein a top surface of the second stage float member bearing a closure membrane is substantially equally inclined with respect to said longitudinal axis, whereby said closure membrane, when in sealing engagement with said outlet aperture, is pressed along its length against the outlet aperture by said top surface of the second stage float member.

16. A valve according to claim 1, wherein the first stage float member and the second stage float member are rotatably restrained with respect to one another.

17. A valve according to claim 1, wherein the first stage float member and the second stage float member are rotatably restrained with respect to the housing.

18. A valve according to claim 1, further comprising a refueling cutoff assembly extending in a fluid venting flow path between the first and second outlet ports and the fluid outlet chamber; said assembly comprising a diaphragm having a top face thereof in flow communication with a filler neck of the fuel tank, and a bottom face thereof exposed to pressure within the valve, said diaphragm having a bleeding aperture extending between top and bottom faces of said diaphragm; said fluid venting flow path being normally closed by the diaphragm and said diaphragm being biased into said closed position by a biasing spring.

19. A valve according to claim 1, further comprising a pressure holding member extending between the second outlet port and the outlet chamber so as to ascertain pressure built up in the fuel tank during fueling for causing fuel to rise in a filler neck of the tank, and to cutoff fueling by an automatic fuel nozzle.

20. A valve according to claim 19, wherein the pressure holding member is in the form of a mass sealing the second outlet port.

21. A valve according to claim 19, wherein the pressure holding member is in the form of a mass sealing the second outlet port which is in the form of an inverted cone.

* * * * *